Feb. 6, 1968          H. R. LABBIE          3,367,728
SELF-ALIGNING BEARING MEANS
Filed June 1, 1965          3 Sheets-Sheet 1
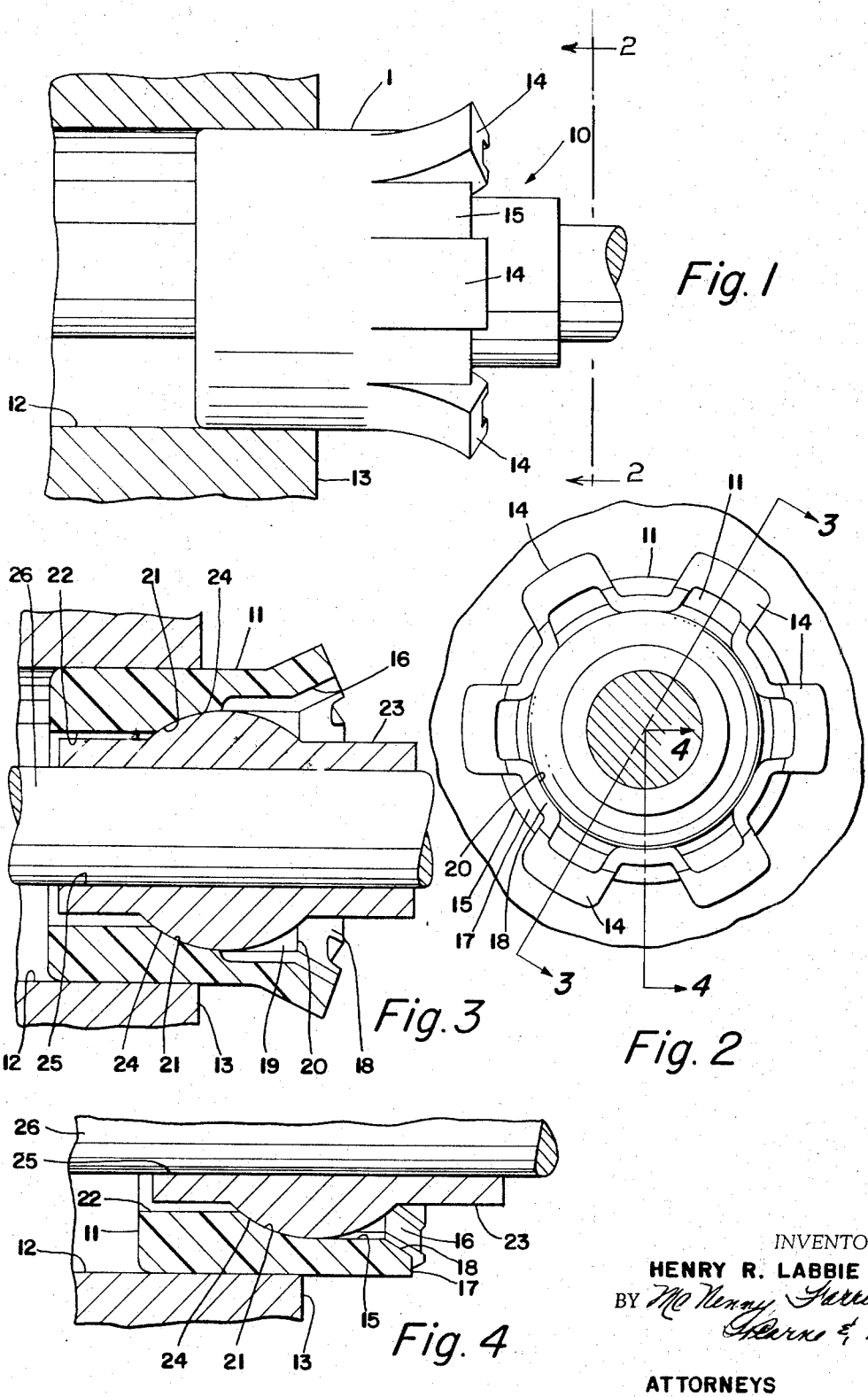
INVENTOR.
HENRY R. LABBIE
ATTORNEYS Feb. 6, 1968  H. R. LABBIE  3,367,728

SELF-ALIGNING BEARING MEANS

Filed June 1, 1965  3 Sheets-Sheet 2

INVENTOR.
HENRY R. LABBIE
BY *McKenny, Farrington,*
*Pearne & Gordon*

ATTORNEYS

Feb. 6, 1968

H. R. LABBIE 3,367,728

SELF-ALIGNING BEARING MEANS

Filed June 1, 1965

INVENTOR.
HENRY R. LABBIE
BY

ATTORNEYS

United States Patent Office 3,367,728
Patented Feb. 6, 1968

3,367,728
SELF-ALIGNING BEARING MEANS
Henry R. Labbie, Cleveland, Ohio, assignor to The Scott & Fetzer Company, Cleveland, Ohio, a corporation of Ohio
Filed June 1, 1965, Ser. No. 460,144
2 Claims. (Cl. 308—26)

ABSTRACT OF THE DISCLOSURE

A bearing for receiving a ball member and having an outer cylindrical surface which is receivable in a cylindrical bore and another surface having a radial array of relatively thick ridges which are connected by relatively thin web portions so that, when the radial array of ridges are compressed to the diameter of the first mentioned cylindrical portion, the relatively thin web portions form a socket surface for a portion of the inner ball member.

---

This invention relates to journal bearings and, more particularly, to a self-aligning ball and socket type bearing assembly.

Bearings of the ball and socket type have long been used to compensate for misalignment between a journal and its bearing, which may cause metal-to-metal contact between the journal and the bearing. Bearings of this type are provided with a spherical outer portion which is mounted in a socket so that the bearing is permitted to deflect to the deflected angle of the shaft. Such bearings and their mounting sockets are conventionally assembled by providing a cylindrical bearing having a ball surface formed on a portion of its periphery, positioning the bearing within a cylindrical sleeve so that a portion of the ball surface engages a socket within the cylindrical sleeve, crimping the sleeve over the remaining portion of the ball surface, and then mounting the cylindrical sleeve and bearing to provide a bearing for a shaft.

Self-aligning ball and socket type bearings produced according to these conventional techniques are relatively expensive, since the production of such bearings involves the mechanical forming step to retain the ball within its socket. Moreover, since the bearing and its cylindrical sleeve are preassembled by the manufacturer, the user of such an assembly must stock a number of units having different size bearing bores. The device according to this invention, on the other hand, enables the user to stock a variety of bearings having different sized bearing bores and relatively few mounting sleeves. The self-aligning ball and socket type bearing according to this invention is assembled by the user and this assembly operation is performed as the cylindrical mounting sleeve is installed.

It is, therefore, an object of this invention to provide a self-aligning ball and socket type bearing assembly which may be easily assembled without special tools or skills and which may be assembled during the installation of the bearing assembly.

Other objects, features, and advantages of the invention will become more apparent from the following detailed description of the invention and from the accompanying drawings.

In the drawings:

FIG. 1 is a fragmentary, elevational view, partly in section, of a self-aligning ball and socket type bearing assembly according to this invention, showing the assembly about to be installed in a mounting hole.

FIG. 2 is a fragmentary, sectional view, the plane of the section being indicated by the line 2—2 in FIG. 1.

FIG. 3 is a fragmentary, sectional view, the plane of the section being indicated by the line 3—3 in FIG. 2.

FIG. 4 is a fragmentary, sectional view, the plane of the section being indicated by the line 4—4 in FIG. 2.

Figure 5:
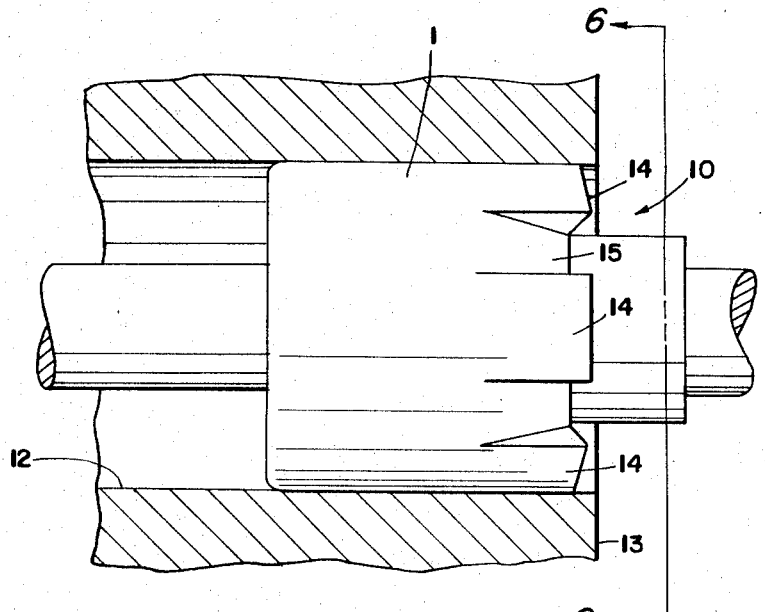
FIG. 5 is a fragmentary, elevational view, partly in section, showing a self-aligning ball and socket type bearing according to this invention in an assembled and mounted position.

Referring now to the drawings, and particularly to FIGS. 1 through 4, a self-aligning ball and socket type bearing assembly 10 is illustrated. The assembly 10 includes a cylindrical sleeve 11 which may be fabricated from a suitable plastic, such as nylon, or from a malleable metal. The outside diameter of the cylindrical sleeve 11 corresponds to the inside diameter of a mounting hole 12 in a block 13. The sleeve 11 is inserted in the hole 12 and this operation will hereinafter be explained.

One end of the sleeve 11 is provided with an annular array of ridges 14. The ridges 14 are separated by an annular array of valleys 15, the outer periphery of which corresponds to the diameter of the sleeve 11. As may be seen most clearly in FIGS. 2 and 3, each ridge 14 is provided with a recessed inner portion 16 that extends longitudinally into the body of the sleeve.

As may be seen most clearly in FIGS. 2 and 4, each valley 15 includes a flat outer face 17 and a beveled face 18. The beveled face 18 communicates with a cylindrical counterbore 19 in the sleeve 11 at a juncture 20.

The counterbore 19 extends into the sleeve 11 and blends into a spherical socket surface 21 which may have a radius of curvature corresponding to the radius of the counterbore 19. The surface 21 communicates with a cylindrical bore 22 which is provided in the sleeve 11.

A cylindrical bearing 23 having a spherical outer portion 24 is initially mounted in the sleeve 11 so that the portion 24 butts against the surface 21. The bearing 23 may be provided with a cylindrical inner bushing surface 25 that may journal a shaft 26 to provide for relative rotation between the block 13 and the shaft 26.

Figure 6:
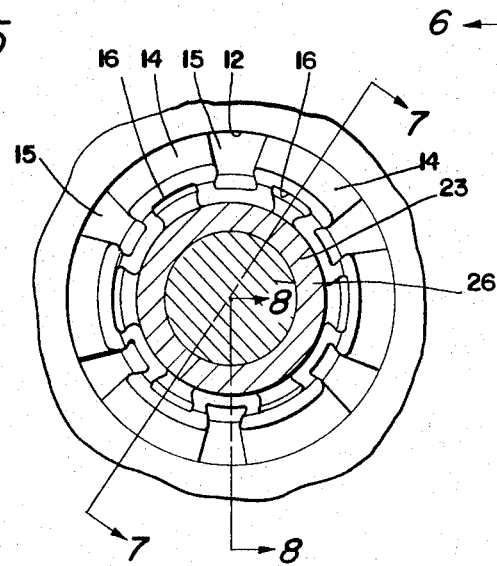
FIG. 6 is a cross sectional view, the plane of the section being indicated by the line 6—6 in FIG. 5.
Figure 7:
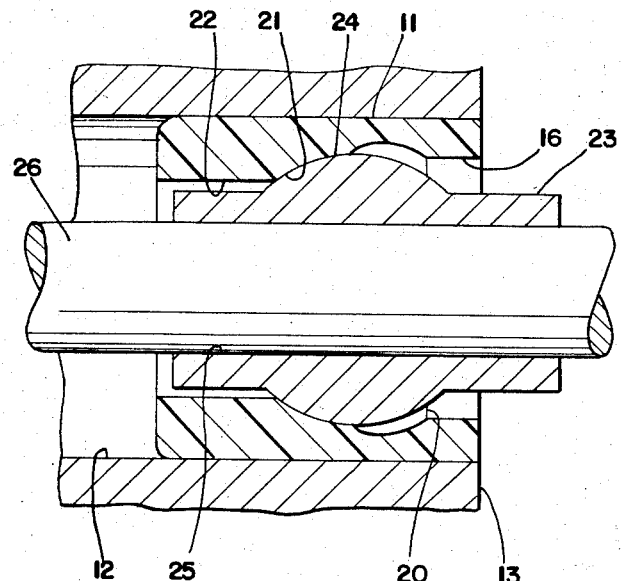
FIG. 7 is a fragmentary, cross sectional view, the plane of the section being indicated by the line 7—7 in FIG. 6.
Figure 8:
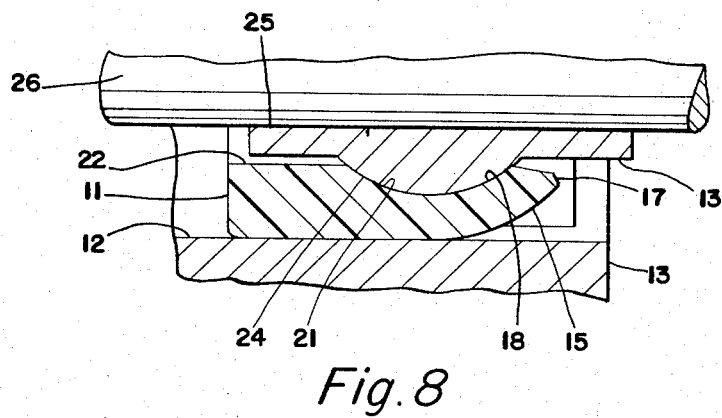
FIG. 8 is a fragmentary, cross sectional view, the plane of the section being indicated by the line 8—8 in FIG. 6.

The assembly comprising the sleeve 11, the bearing 23, and the shaft 26 may be mounted in the hole 12 by pushing the sleeve 11 and the bearing 23 to the left, as viewed in FIG. 1. As the outer flared faces of the ridges 14 are pressed into the hole 12, the ridges 14 are forced to conform to the cylinder defined by the hole 12. As the ridges are thus forced radially inwardly, the valley portions 15 are bent still further inwardly, as is shown in FIGS. 6 and 8. As the valley portions 15 are bent inwardly, the cylindrical surface 19 is caused to assume a spherical shape that conforms to the surface of the portion 24 to thus form a seat for the other half of the portion 24.

The resulting ball and socket type bearing assembly permits deflection of a bearing-suppported member, such as the shaft 26, relative to the block 13. This deflection is permitted by movement of the portion 24 within its socket defined by the surfaces 19 and 21.

The scope of the invention is not limited to the slavish imitation of all of the structural and operative details mentioned above. These have been given merely by way of an example of a presently preferred embodiment of the invention.

What is claimed is:
1. A self-aligning ball and socket type bearing assembly comprising an inner ball member formed as a bushing, socket means comprising a cylindrical sleeve having an open end through which a bore extends, said end having relatively thick ridges which are flared to a diameter which is greater than the diameter of the remainder of the cylinder and having relatively thin connecting web portions between said ridges which are less than the flared diameter, a socket surface formed between said bore and said flared end to bearingly receive one side of said ball member, said flared end being squeezable around the other side of said ball member so that the web portions establish bearing contact therewith and thereby provide socket means on said other side of said ball member.

2. A self-aligning ball and socket type bearing assembly according to claim 1 in which the inside of each ridge is provided with a recess at said open flared end of the socket means.

References Cited

UNITED STATES PATENTS

| | | | |
|---|---|---|---|
| 1,693,748 | 12/1928 | Fiegel et al. | 308—72 |
| 2,393,501 | 1/1946 | Brown | 287—90 X |
| 2,710,208 | 6/1955 | Ross et al. | 287—90 X |
| 3,063,761 | 11/1962 | Hoddy et al. | 308—72 |
| 3,089,718 | 5/1963 | Gottschald et al. | 287—90 X |
| 3,252,742 | 5/1966 | Swanstrom | 308—72 |

FOREIGN PATENTS

| | | |
|---|---|---|
| 666,576 | 5/1929 | France. |
| 657,849 | 3/1938 | Germany. |

MARTIN P. SCHWADRON, *Primary Examiner.*

R. F. HESS, *Assistant Examiner.*